United States Patent
Weidhaas

(10) Patent No.: US 8,005,269 B2
(45) Date of Patent: Aug. 23, 2011

(54) METHOD FOR IMAGE-BASED DRIVER IDENTIFICATION IN A MOTOR VEHICLE

(75) Inventor: Stefan Weidhaas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1195 days.

(21) Appl. No.: 11/724,256

(22) Filed: Mar. 15, 2007

(65) Prior Publication Data

US 2007/0183635 A1 Aug. 9, 2007

Related U.S. Application Data

(63) Continuation of application No. PCT/EP2005/009544, filed on Sep. 6, 2005.

(30) Foreign Application Priority Data

Sep. 16, 2004 (DE) .......... 10 2004 044 771

(51) Int. Cl.
 *G06K 9/00* (2006.01)
(52) U.S. Cl. ........................................ 382/118
(58) Field of Classification Search ........................ None
 See application file for complete search history.

(56) References Cited

U.S. PATENT DOCUMENTS

| | | | |
|---|---|---|---|
| 5,729,619 A | 3/1998 | Puma | |
| 6,181,805 B1 * | 1/2001 | Koike et al. | 382/118 |
| 6,400,835 B1 | 6/2002 | Lemelson et al. | |
| 6,681,032 B2 | 1/2004 | Bortolussi et al. | |
| 2001/0019620 A1 | 9/2001 | Nagai et al. | |
| 2003/0039378 A1 | 2/2003 | Yuasa et al. | |
| 2003/0125855 A1 | 7/2003 | Breed et al. | |

FOREIGN PATENT DOCUMENTS

| | | |
|---|---|---|
| DE | 198 19 961 A1 | 11/1999 |
| WO | WO 02/08023 A2 | 1/2002 |

OTHER PUBLICATIONS

International Search Report dated Dec. 5, 2005 (Three (3) Pages).
German Search Report dated Feb. 10, 2006 with English translation (Seven (7) Pages).

* cited by examiner

*Primary Examiner* — Daniel Mariam
*Assistant Examiner* — Elisa Rice
(74) *Attorney, Agent, or Firm* — Crowell & Moring LLP

(57) ABSTRACT

A method for image-based driver identification in a motor vehicle is provided. At least one two-dimensional driver facial image is recorded using a camera. Recorded driver facial images are temporarily stored. The temporarily stored driver facial images are compared to two-dimensional reference images of each possible driver from multiple possible drivers of the motor vehicle. The current recording angle between the camera and the facial normal line of the driver is determined by a device not otherwise used for image-based driver identification and relayed to the method for image-based driver identification and the recording of a driver facial image is triggered when the current recording angle reaches a specific preset value.

11 Claims, 2 Drawing Sheets

METHOD FOR IMAGE-BASED DRIVER IDENTIFICATION IN A MOTOR VEHICLE

CROSS REFERENCE TO RELATED APPLICATIONS

This application is a continuation of PCT International Application No. PCT/EP2005/009544, filed Sep. 6, 2005, which claims priority under 35 U.S.C. §119 to German Patent Application No. 10 2004 044 771.3 filed Sep. 16, 2004, the entire disclosures of which are herein expressly incorporated by reference.

BACKGROUND AND SUMMARY OF THE INVENTION

The present invention relates to a method for image-based driver identification in a motor vehicle by recording at least one two-dimensional driver facial image using a camera, temporarily storing recorded driver facial images, and comparing temporarily stored driver facial images to two-dimensional reference images of each possible driver of multiple possible drivers of the motor vehicle.

The identification of individuals on the basis of visual facial recognition is increasingly used in systems having access/usage restriction. Examples are access to security-critical areas in buildings and the use of motor vehicles. In addition, concepts are known in the motor vehicle field in particular, according to which comfort settings for a specific driver are assumed automatically after the driver has been identified using facial recognition.

For image-based facial recognition of a target person, in particular the driver of a motor vehicle, at least one image of the face is recorded by a camera. The facial image of the target person is subsequently compared by computer to stored reference images of various possible target persons, which are typically saved in a databank. This comparison may be performed on the basis of the pure image data or on the basis of features extracted from the images. The identity of the target person is subsequently judged on the basis of the degree of correspondence established upon the comparison of the images and/or their features.

In principle, it is advantageous for good recognition performance if the images compared to one another have approximately the same recording angle, i.e., the same angle between the recording camera and the facial normal lines of the target person. In addition, the majority of known facial recognition systems are based on the assumption that the essential characteristics of a face may be visually acquired best in frontal recordings.

Therefore, in most known systems, only frontal recordings are saved as reference images in a databank. As facial images of the target persons are recorded, it is also ensured by an appropriate placement of the camera and/or by an appropriate instruction to the target person that an essentially frontally recorded facial image may be generated. The placement of a camera for this purpose is connected to a high technical outlay, however. The necessity of following an instruction in regard to the head positioning and/or orientation by the target person restricts the comfort of the target person. In particular for the driver of a motor vehicle, such a method is not practical in the long-term.

Various newer methods are concerned with the object of making facial recognition more robust in relation to recording angles deviating from one another in the recorded facial image and reference image. The facial recognition can be implemented independently of the availability of a frontal facial image. Feature-based methods are generally distinguished in this case by greater robustness than methods based purely on the analysis of image data (e.g., template matching). However, the best recognition performance is also to be expected in feature-based methods upon the comparison of images having corresponding recording angles, in particular upon the comparison of frontal recordings.

A method is known from U.S. Pat. No. 6,681,032 B2, in which facial images, which are recorded from a non-frontal recording angle, are converted into a frontal image by a computing operation based on a geometrical model. The high computing outlay for the transformation, which may be implemented in an acceptable time only at high cost or not at all in a motor vehicle, is a significant disadvantage of this method. In addition, the quality of a model-based transformation of a non-frontally recorded facial image is undeniably inferior to the quality of a frontally recorded image, even in the event of high model quality.

In general, it is to be noted that methods which claim robustness in regard to recording angles deviating from one another in the recorded facial image and reference image, such robustness is necessarily accompanied by a reduction of the reliability of a system in regard to incorrect identification. In applications in which permanent and/or repeated access of unauthorized target persons to a facial recognition system is possible under certain circumstances, such as a motor vehicle, such a reduction of the reliability is not acceptable.

Methods which calculate a three-dimensional model of the face of the target person from multiple recorded images are precluded in motor vehicles because of the high computing outlay connected with such a method. In the following, the processing of two-dimensional facial images of a target person and two-dimensional reference images is assumed.

A further approach for solving the problem of an undefined recording angle of the recorded facial image of the target person is to record multiple facial images of a target person from different recording angles and/or to save multiple reference images from different recording angles in a databank for every possible target person. The subsequent comparison of all possible combinations of a facial image to a reference image increases the probability of finding a combination having approximately corresponding recording angles.

A targeted selection of combinations having corresponding recording angles is typically not possible in such methods, because the recording angle itself is not known at least for recorded facial images. Therefore, the computing outlay required increases strongly due to the increasing combinatorial variety with increasing number of recorded facial images and/or saved reference images. Such methods are therefore unsuitable for use in a motor vehicle.

The computing outlay for the comparison operations may be reduced if a device that detects the recording angle are available in a method. Determining the recording angle from the recorded two-dimensional facial images is itself greatly subject to error, however, and requires its own computing outlay. Providing a dedicated device for detecting the recording angle required in the method for facial recognition is connected to significant technical outlay. Both solution approaches are therefore only suitable in a limited way for use in a motor vehicle.

Exemplary embodiments of the present invention provide a low-interaction and reliable method for establishing the identity of the driver of a motor vehicle by facial recognition, which may be performed without providing additional devices and with low computing outlay.

In accordance with exemplary embodiments of the present invention, the current recording angle of a device already existing in the motor vehicle, which is not used for image-based driver identification, is provided. The recording angle may therefore be stipulated as known without providing additional devices.

Furthermore, in accordance with exemplary embodiments of the present invention the recording of a driver facial image is triggered precisely when the current recording angle reaches a determined preset value. It is thus ensured that a driver facial image is recorded at a recording angle essentially corresponding to the preset value, may be temporarily stored, and may be used for comparison to reference images.

In the simplest case, a frontal recording angle is established as the single preset value, upon reaching the frontal recording angle, a driver facial image is recorded, this driver facial image is temporarily stored and used for comparison to reference images.

In accordance with exemplary embodiments of the present invention, driver facial images are exclusively compared to reference images which have essentially the same recording angle. In the above-mentioned simplest case, the frontally recorded driver facial images are therefore exclusively compared to frontally recorded reference images.

Good recognition performance is ensured in general by the comparison of driver facial images and reference images having essentially equal, ideally frontal recording angles. To further increase the reliability of a method according to the present invention for facial recognition and/or to ensure the ability to perform such a method, the following embodiments and refinements are provided.

According to various advantageous embodiments of a method according to the present invention, multiple preset values are established for recording driver facial images. Depending on the embodiment of the present invention, either all or only a part of the recorded driver facial images are subsequently temporarily stored, subsequently all or only a part of the temporarily stored driver facial images are in turn used for comparison to reference images.

Because a method according to the present invention is to be executed with as little interaction as possible, i.e., without an instruction to the operator in regard to his head positioning or orientation, it may not be predicted whether a preset value for the recording angle will actually be achieved. Therefore, driver facial images having suboptimal recording angles may be initially stored, but not use these later for comparison to reference images if, at a later time, driver facial images may be recorded and temporarily stored which may be evaluated better, i.e., are better suitable for performing the comparison to reference images at a higher reliability level. In this way, computing outlay for unnecessary comparison operations may be saved, but the possibility is retained of starting a facial recognition on the basis of the suboptimal driver facial images if needed.

In order to save additional memory space in a temporary memory for temporarily stored driver facial images, a lower number of driver facial images than were established as preset values may be temporarily stored. As a first procedure, the temporary storage or even the recording of driver facial images at suboptimal preset values may be omitted if, at an earlier time, driver facial images which may be evaluated better were able to be recorded and temporarily stored. In addition, temporarily stored suboptimal driver facial images which are already temporarily stored may be overwritten in the temporary memory by driver facial images which may be evaluated better.

Finally, a smaller number of temporarily stored driver facial images may result than the number of the preset values if the performance of comparison operations for facial recognition is begun when triggered by a specific event, such as the expiration of a timer, although a driver facial image was not yet able to be recorded for every preset value.

The sequence of overriding or replacing driver facial images temporarily stored in the temporary memory may be controlled, for example, in that preset values are each assigned a priority and temporarily stored driver facial images may be replaced by driver facial images recorded at a later time, whose preset value is assigned a higher priority.

In a comparable way, the selection of which temporarily stored driver facial images are used for comparison may be priority-controlled. For this purpose, separate priorities may be established or the priorities for the driver facial images recorded for temporary storage may be used.

Establishing the number of preset values, the preset values themselves, and their priorities, but also the establishment of the number of temporarily stored driver facial images and the number of driver facial images used for comparison may be performed at the beginning of a method and/or may be adapted to the altered situation in the course of the method, in particular after the recording or temporary storage of individual driver facial images.

Other method rules, according to which the recording, temporary storage, and analysis of driver facial images are to be performed, may be implemented in connection with the present invention.

Because a complete databank having reference images of all possible drivers of a motor vehicle from all possible recording angles may not always be assumed, the method rules to be implemented are expediently defined oriented to the distribution of the recording angles of the available reference images. For this purpose, the recording angles of the reference images must also be known and assigned thereto.

The use of multiple temporarily stored driver facial images for comparison with reference images may have various reasons as a function of the method rules used as a basis.

Firstly, the cause may be an incomplete databank of reference images. For example, the databank may not have reference images of all possible drivers of the motor vehicle for the recording angle A or the recording angle B, but at least one reference image from one of the two recording angles for every possible driver is included. In this case, a driver facial image having the recording angle A and a driver facial image having the recording angle B would preferably be used for the comparison.

In addition, to increase the reliability of a method according to the present invention, it may be advisable for multiple driver facial images from different recording angles to be compared with a reference image of the same possible driver and for the comparison results to be linked to one another. In the simplest case, a linkage may comprise selecting the comparison result having the largest or smallest correspondence. Alternatively, any arbitrary form of linkage, mathematical filtering, or statistical analysis (e.g., calculating the mean value or median) of the individual comparison results may be performed.

A method according to the present invention is based on the assumption, which is especially applicable in a motor vehicle, that a target person, the driver of the motor vehicle here, at least temporarily orients his head in a specific direction, which essentially corresponds to the travel direction, within a finite time span. A head orientation in the travel direction is already favored by the orientation of the driver seat even in the time before beginning travel, but after entering the motor vehicle. Therefore, if a camera is attached in the motor vehicle in such a way that a specific recording angle results in the event of a facial normal line of the driver oriented essentially in the travel direction, it is thus ensured that a driver facial image may be recorded at a corresponding specified preset value within a finite time. This condition is fulfilled in many modern motor vehicles by a camera belonging to a device already provided in the motor vehicle, which is not primarily used for image-based driver identification. The occurrence of all recording angles which closely surround the recording angle existing in the event of head orientation of the driver in the travel direction is also to be expected at high probability due to the natural head movements of a driver.

A further advantage of the present invention, which results therefrom, is that typically no request must be given to the driver to produce a specific recording angle by his seat position, or head and/or body posture.

In order to nonetheless be able to perform an identification of the driver in exceptional situations, according to a refinement of the present invention, after expiration of a predefined time span or upon the occurrence of a specific event, if not all driver facial images required for performing the facial recognition at a sufficient reliability level are available, a request is given to the driver to support the driver identification by assuming a specific seat position, or head and/or body posture.

Other objects, advantages and novel features of the present invention will become apparent from the following detailed description of the invention when considered in conjunction with the accompanying drawings.

BRIEF DESCRIPTION OF THE DRAWINGS

The present invention is explained in greater detail on the basis of the attached drawing.

DETAILED DESCRIPTION OF THE DRAWINGS

In the scope of the following exemplary embodiment, the driver of a motor vehicle is to be identified among multiple possible drivers of the motor vehicle by a method according to the present invention for image-based driver identification. In the method, two-dimensional driver facial images are recorded for this purpose by a camera. All or only a part of the recorded driver facial images are temporarily stored in the temporary memory. All or a part of the temporarily stored driver facial images are compared to two-dimensional reference images of a possible driver. Every driver facial image used for comparison to reference images is exclusively compared to reference images which have essentially the same recording angle as the driver facial image.

The current recording angle between the camera and the facial normal line of the driver is known at all times. It is determined by a device otherwise not used for image-based driver identification, here a device for attentiveness detection in regard to the driver of the motor vehicle, and relayed to the method for image-based driver identification. The device for attentiveness detection is provided in the motor vehicle functionally decoupled, except for the relay of the recording angle, from the method for image-based driver identification. According to an exemplary embodiment of the present invention, further parts of the device for attentiveness detection (e.g., a camera and/or a computing unit) are additionally used as a shared resource for performing the method according to the present invention for image-based driver identification.

Figure 1:
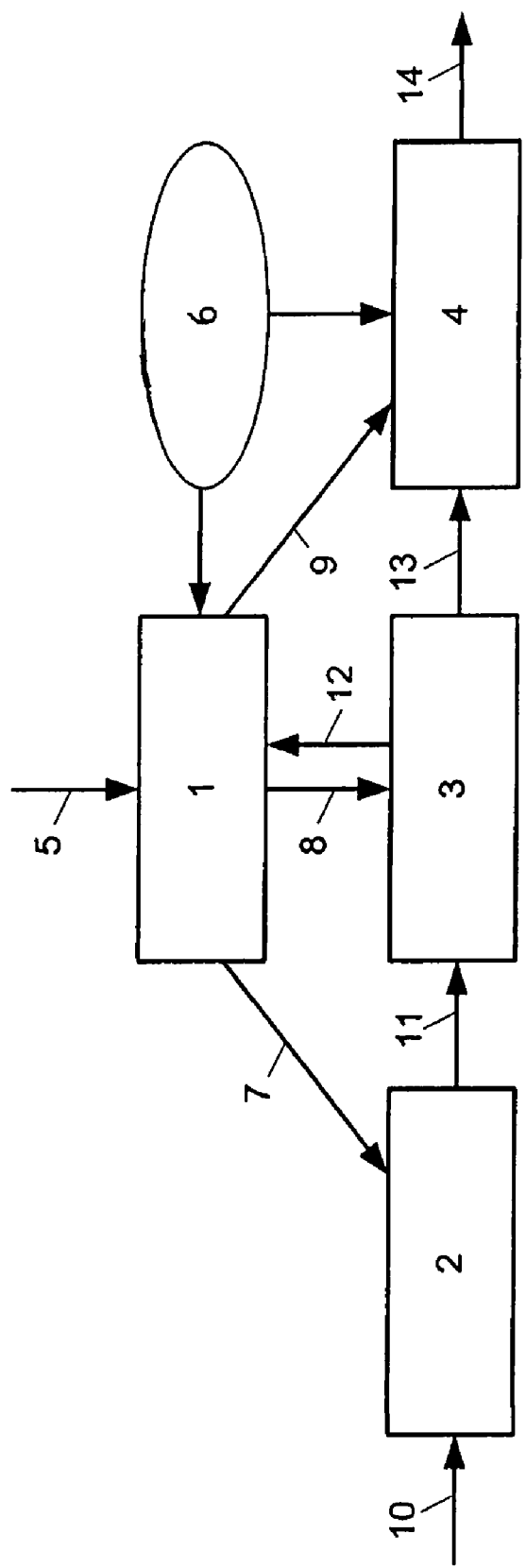
FIG. 1 schematically shows the signal flow of a method according to exemplary embodiments of the present invention for image-based driver identification, and FIG. 2 schematically shows the time sequence of the recording of driver facial images according to established preset values for the recording angle.

FIG. 1 schematically shows the signal flow of the method according to the present invention for image-based driver identification. In method part 1, the available data bank 6 having reference images is analyzed in regard to the distribution of the recording angles of the reference images contained therein. Various method rules for the subsequent facial recognition are established as a result of the analysis. To implement the method rules, method parameters are established and transmitted to the other method parts 2, 3, and 4. The transmission is performed by the signals 7, 8, and 9. The establishment of the method parameters may be a function of the occurrence of external events such as the expiration of a timer. Such external events are contained in the signal 5, which enters the method part 1.

For example, if it is established that a frontal image is available in the data bank for every possible driver, the method rules and parameters are established in such a way that precisely one frontal image of a driver is recorded, this image is temporarily stored, and is used for comparison to reference images. The following simple method parameters result:

Number of preset values $N_v=1$, preset value $V_1=0°$, priority of the preset value $P(V_1)=1$, number of driver facial images to be temporarily stored $N_z=1$, number of driver facial images to be used for comparison $N_c=1$, linkage operation for comparison results $R_c=$<none>.

In contrast, if it is established that there is not a frontally recorded reference image of every possible driver in the data bank 6, but a reference image having the recording angle +10° exists for each of the remaining possible drivers, the method rules and parameters may be established in such way that a driver facial image is recorded at both 0° and also +10°, both are temporarily stored, only one of the two is used for the comparison, and if both reference images are available, the driver facial image from 0° is used. The method parameters for this purpose may read as follows, for example:

$N_v=2$, $V_1=0°$, $V_2=+10°$, $N_z=2$, $N_c=1$, $P(V_1)=1$, $P(V_2)=0.5$, $R_c=$<none>.

For the two examples above, the execution of the method is explained in detail in the following. The execution for more complicated method rules results accordingly. More complicated method rules, which may also be implemented by establishing method parameters and adapting them in the course of the method, may read as follows:

For every possible driver:
{
if reference image 0° available:
{
  compare driver facial image 0° to reference image 0°;
  transmit comparison result to identity establishment;
}
otherwise:
{
  if reference image −10° AND +10° available:
  {
  compare driver facial image −10° to reference image −10°;
    compare driver facial image +10° to reference image +10°;
    transmit mean value of the comparison results to identity establishment;
  }
  otherwise:
  {
    if timer expired:
    {

```
        compare driver facial image having highest priority, to which
        a reference image having identical recording angle is
        available, to this reference image;
        transmit comparison result to identity establishment;
      }
    }
  }
}
```

In method part 2 shown in FIG. 1, the recording angle 10 relayed from the device for attentiveness detection is monitored and the driver facial images "requested" by the establishment of the method parameters 7, in particular the preset values, are recorded.

Figure 2:
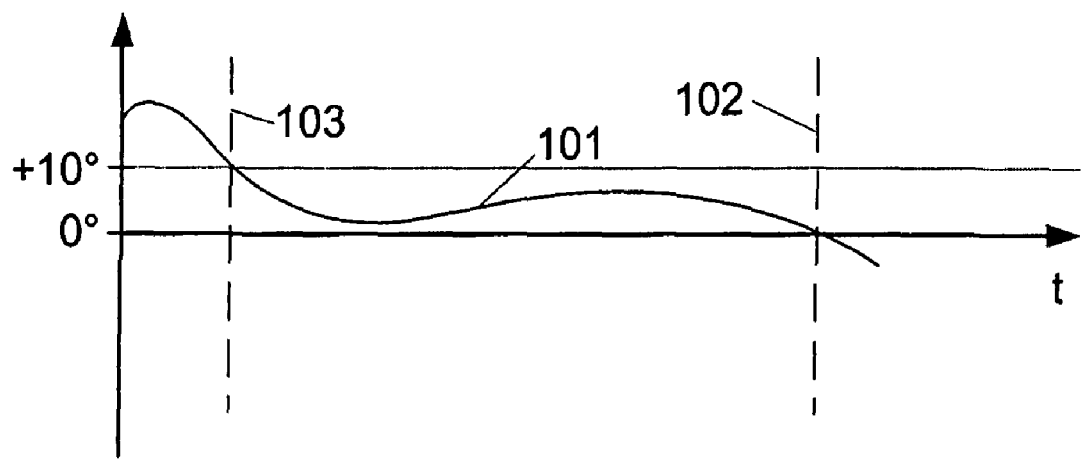

FIG. 2 shows the time sequence of the recording of driver facial images according to established preset values for the recording angle. The curve 101 shows an example of a time curve of the recording angle relayed to the method for image-based driver identification. According to the first above-mentioned example ($N_v=1$), a driver facial image is only recorded at 0°. The instant 102 identifies the instant at which the recording occurs. According to the second above-mentioned example ($N_v=2$), a driver facial image is recorded both at 0° at instant 102 and also already previously at +10° at instant 103.

Driver facial images recorded in method part 2 are transferred to method part 3 (signal 11). If all "requested" driver facial images have not yet been recorded, the method part 2 still remains active.

In method part 3, recorded driver facial images are temporarily stored in accordance with the received method parameters 8. In the above example, the single recorded driver facial image is temporarily stored in method part 3 ($N_z=1$). In the second example, both recorded driver facial images are temporarily stored ($N_z=2$).

In other cases, it may occur that individual received driver facial images 11 are not temporarily stored according to the method rules and method parameters 8. A corresponding method rule may read as follows, for example: "record driver facial images for 4 preset values, temporarily store those driver facial images having the highest priority of all driver facial images recorded up to this point." In most cases, corresponding method rules may be implemented more efficiently by an adaptation of the method parameters as a function of already performed recordings and temporary storages as described in the following.

The recording or the temporary storage of driver facial images at specific preset values is communicated to the method part 1 for this purpose. As shown in FIG. 1, the temporary storage is communicated via the signal 12. Subsequently, in method part 1, the method parameters and rules are adapted as a function of the driver facial images already temporarily stored. For example, in the simplest case, the preset values of driver facial images which have already been recorded or temporarily stored may be dispensed with by the adaptation. Frequently, preset values which are assigned lower priorities than the preset values of already recorded or temporarily stored driver facial images may be removed. In the case of more complicated linkages, entire partial rules and thus also multiple preset values may be omitted and/or the preset of priorities or preset values may become obsolete.

The temporarily stored driver facial images are provided to the method part 4 via the signal 13 shown in FIG. 1. The comparison to the reference images from the data bank 6 occurs here. According to the method parameters 9, only a part of the temporarily stored driver facial images are possibly used for the comparison.

In the first example above, the single temporarily stored driver facial image is used for comparison. In the second example, only one temporarily stored driver facial image is also used for every possible driver. However, it is determined according to the priorities of the preset values belonging to the driver facial images which driver facial image is preferably used. In the example: $P(V_1) > P(V_2)$. Accordingly, if reference images are available for $V_1$ and $V_2$, the driver facial image for $V_1$ is used.

In the implementation of more complicated rules, multiple driver facial images are each compared to corresponding reference images of the same possible driver. The individual comparison results are subsequently linked by a mean value calculation, for example (cf.: no linkage operation in the first two examples).

The identity of the driver is subsequently also ascertained in method part 4 in a way known per se from the comparison results and/or their linkages, which each represent a measure of the correspondence of the driver facial images used for comparison with the reference images of possible drivers of the motor vehicle used for comparison, and output as the signal 14.

The above embodiment relates to the consideration of a single recording angle. In practice, this will particularly be the angle of rotation between the facial normal line of the driver and the camera around the vertical axis. Exemplary embodiments of the present invention also include the additional consideration of at least one further spatial angle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for image-based driver identification in a motor vehicle, comprising the acts of:
    recording at least one two-dimensional driver facial image using a camera;
    temporarily storing recorded driver facial images;
    comparing temporarily stored driver facial images to two-dimensional reference images of a possible driver from multiple possible drivers of the motor vehicle; and
    determining the current recording angle between the camera and the facial normal line of the driver by a device not otherwise used for image-based driver identification,
    wherein the recording of a driver facial image is triggered when the current recording angle reaches a specific preset value.

2. The method according to claim 1, wherein every driver facial image used for comparison to reference images is exclusively compared to reference images which have essentially the same recording angle as the driver facial image.

3. The method according to claim 1, wherein the number of driver facial images which are used for comparison to reference images is less than the number of temporarily stored driver facial images.

4. The method according to claim 1, wherein the number of temporarily stored driver facial images is less than the number of established preset values.

5. The method according to claim 3, wherein the preset values are each assigned a priority and the temporary storage of recorded driver facial images or the selection of temporarily stored driver facial images for comparison to reference images is performed on the basis of the priorities.

6. The method according to claim 4, wherein the preset values are each assigned a priority and the temporary storage of recorded driver facial images or the selection of temporarily stored driver facial images for comparison to reference images is performed on the basis of the priorities.

7. The method according to claim 1, wherein at least one of the parameters of number of preset values, preset values, priority of the preset values, number of temporarily stored driver facial images, and number of driver facial images used for comparison is oriented to the distribution of the recording angles of the available reference images.

8. The method according to claim 1, wherein at least one of the parameters of number of preset values, preset values, priority of the preset values, number of temporarily stored driver facial images, and number of driver facial images used for comparison is adapted after the recording or temporary storage of a driver facial image, oriented to the number and distribution of the recording angles of the recorded or temporarily stored driver facial images.

9. The method according to claim 1, wherein at least two driver facial images used for comparison are each compared to a reference image of the same possible driver and the comparison results are linked to one another.

10. The method according to claim 1, wherein precisely one driver facial image is recorded from an essentially frontal recording angle.

11. The method according to claim 1, wherein after the occurrence of a specific event, if the available driver facial images are not sufficient for reliable driver identification, a request is given to the driver to cause a specific recording angle by his seat position, or head and/or body posture.

* * * * *